United States Patent [19]
Schulz

[11] Patent Number: 6,001,247
[45] Date of Patent: Dec. 14, 1999

[54] REMOVABLE, IN-LINE DIFFUSER APPARATUS FOR OZONE DISINFECTION OF WATER

[76] Inventor: Christopher R. Schulz, 18830 Ridge Rd., Northville, Mich. 48167

[21] Appl. No.: 08/844,911

[22] Filed: Apr. 23, 1997

Related U.S. Application Data

[63] Continuation-in-part of application No. 08/641,545, May 1, 1996, abandoned.

[51] Int. Cl.⁶ .................................................... C02F 1/72
[52] U.S. Cl. .......................... 210/192; 210/760; 210/764; 210/759; 210/220; 210/199
[58] Field of Search .................................. 210/760, 764, 210/192, 259, 220, 221.2, 195.1, 199; 422/186.12, 186.1, 186.07, 24, 28; 261/116, DIG. 42

[56] References Cited

U.S. PATENT DOCUMENTS

| | | | |
|---|---|---|---|
| 1,821,266 | 9/1931 | Lewis | 210/192 |
| 2,050,771 | 8/1936 | Wait | 210/192 |
| 3,445,001 | 5/1969 | Raus | 210/760 |
| 3,680,704 | 8/1972 | Schaefer | 210/218 |
| 3,682,314 | 8/1972 | Blatter | 210/199 |
| 3,764,011 | 10/1973 | Owens | 210/195 |
| 3,775,314 | 11/1973 | Beitzel et al. | 210/760 |
| 3,784,008 | 1/1974 | Troglione | 210/192 |
| 3,823,728 | 7/1974 | Burris | 210/760 |
| 3,945,918 | 3/1976 | Kirk | 210/255 |
| 4,043,913 | 8/1977 | Hintermeister | 210/169 |
| 4,250,040 | 2/1981 | LaRaus | 120/760 |
| 4,507,253 | 3/1985 | Wieseman | 261/22 |
| 4,572,821 | 2/1986 | Brodard et al. | 422/186.12 |
| 4,581,137 | 4/1986 | Edwards et al. | 210/220 |
| 4,597,877 | 7/1986 | Gaia | 210/750 |
| 4,614,596 | 9/1986 | Wyness | 210/754 |
| 4,663,089 | 5/1987 | Lowry et al. | 261/23.1 |
| 4,696,739 | 9/1987 | Pedneault | 210/121 |
| 4,780,287 | 10/1988 | Zeff et al. | 422/186.3 |
| 4,834,872 | 5/1989 | Overath | 210/151 |
| 4,883,589 | 11/1989 | Konon | 210/140 |
| 4,898,679 | 2/1990 | Siegel et al. | 210/752 |
| 4,990,316 | 2/1991 | Duquet | 210/760 |
| 5,004,537 | 4/1991 | Brown | 210/192 |
| 5,015,394 | 5/1991 | McEllheaney et al. | 210/744 |
| 5,053,140 | 10/1991 | Hurst | 210/704 |
| 5,078,965 | 1/1992 | Pearson | 422/3 |
| 5,116,574 | 5/1992 | Pearson | 422/3 |
| 5,173,257 | 12/1992 | Pearson | 422/3 |
| 5,273,664 | 12/1993 | Schulz | 210/759 |
| 5,302,298 | 4/1994 | Leitzke | 210/748 |
| 5,326,469 | 7/1994 | Thompson | 210/192 |
| 5,376,266 | 12/1994 | Broussard | 210/195.1 |
| 5,397,480 | 3/1995 | Dickerson | 210/752 |
| 5,458,789 | 10/1995 | Dickerson et al. | 210/750 |
| 5,464,543 | 11/1995 | Moore | 210/794 |
| 5,498,347 | 3/1996 | Richard | 210/739 |
| 5,562,822 | 10/1996 | Furness, Jr. et al. | 210/188 |
| 5,785,864 | 7/1998 | Teran et al. | 210/739 |

*Primary Examiner*—Cynthia L. Nessler
*Attorney, Agent, or Firm*—Alfred J. Mangels

[57] ABSTRACT

A device for introducing ozone uniformly into water flowing through a conduit for disinfecting the water. An ozone contacting vessel is provided and includes a downflow tube through which water is caused to flow. The downflow tube is positioned vertically within a diffusion chamber. Within the downflow tube are a plurality of layers of transversely extending porous elements that are in communication with a source of ozone to provide a relatively uniform distribution of fine ozone bubbles over the cross-sectional area of the downflow tube. The porous elements are carried by an ozone conduit that is substantially coaxially positioned within the downflow tube. Spacer members are provided to space the porous elements from the downflow tube wall, and the entire ozone distributor assembly can be easily removed form the downflow tube for servicing the porous elements and can then be easily reinstalled thereafter. The downflow tube can be a straight tube or it can be J-shaped, to convey ozonated water into downstream ozone reaction cells to permit oxidation or disinfection of the water being treated.

30 Claims, 10 Drawing Sheets

6,001,247

REMOVABLE, IN-LINE DIFFUSER APPARATUS FOR OZONE DISINFECTION OF WATER

CROSS-REFERENCE TO RELATED APPLICATION

This application is a continuation-in-part of application Ser. No. 08/641,545, filed May 1, 1996 now abandoned.

BACKGROUND OF THE INVENTION

1. Field of the Invention

The present invention relates to an apparatus for disinfecting water by the direct introduction of gaseous ozone into the water. More particularly, the present invention relates to a water treatment apparatus in which gaseous ozone is introduced into a vertically disposed water conduit by a plurality of porous diffuser elements positioned within the conduit.

2. Description of the Related Art

The notion of treating water with gaseous ozone for disinfection is well known. Various types of apparatus and methods have been devised to introduce and dissolve gaseous ozone into water for treatment of the water by providing retention chambers in which the ozone is introduced through mechanical mixers, injectors, porous diffusers, and packed columns. The primary purpose of each of those approaches is to transfer sufficient gaseous ozone to the water to be treated, in order to provide the required contact time of the ozone with the water so that the disinfection treatment is as thorough as possible.

Although there are several known approaches to accomplish the disinfection operation, even the more efficient of those processes, in terms of the efficiency of exposure of the water to ozone, include certain drawbacks. For example, although packed column technology provides transfer efficiencies of from about 80% to about 95%, there is little operational experience with such approaches, and, more significantly, there is a strong potential for high head losses as the result of build-up of scale on the column medium. Mechanical mixing, on the other hand, although capable of providing ozone transfer efficiencies in the range of from about 90% to about 98%, involves short ozone-water contact times that might require retreatment for effective disinfection. Additionally, mechanical mixing also involves high operating cost because of the energy usage and the requirement for maintenance of the mechanical equipment.

Fine bubble diffuser contactors, another approach for effecting disinfection of water by the introduction of ozone, are quite widely used and provide ozone transfer efficiencies in the range of about 90% to about 95%. They operate effectively at low to medium ozone concentrations (<6% by wt.) when there is a sufficient volumetric ozone flow rate delivered to the ozone contactor to effectively distribute the ozone to the diffusers and provide adequate ozone-water mixing for homogenous ozone dissolution. However, at higher ozone concentrations (8 to 12% by wt.) and lower gas flow rates, which often result when oxygen feed gas systems and advanced technology ozone generators are employed, there is an increased risk of gas bubble channeling, with resultant inadequate contact between the ozone gas bubbles and the water being treated, which could cause incomplete disinfection of the water.

To overcome inefficient mixing conditions in fine bubble diffuser systems at higher ozone concentrations, the present inventor developed an improved ozone dissolution system, combining a sidestream venturi injection system with a specially designed downflow tube to convey the ozone-water mixture into an ozone contactor. The downflow tube is installed inside one or more diffusion chambers of the ozone contactor to increase the time of contact of the ozone with the water. Turbulent mixing conditions are provided by the sidestream venturi injection system, even at low plant flows or low ozone doses. Pressurized sidestream flows discharge into the downflow tube through opposing dual venturi injectors, which also pull ozone gas onto the sidestream flows under negative pressure. In addition, the vertically oriented downflow tube maximizes bubble hold-up, thereby increasing bubble contact time with the water and improving ozone mass transfer rates. An example of such a system is disclosed in the present inventor's U.S. Pat. No. 5,273,664, which issued on Dec. 28, 1993, and is entitled, "Apparatus and Method for Disinfection of Water by Ozone Injection." That patent discloses the combination of sidestream injection and injection within the downflow tube to introduce ozone into the water.

Although the sidestream injection and downflow tube apparatus and method disclosed in the above-mentioned patent provides distinctly improved ozone transfer efficiency, it does so at a higher capital cost and complexity, as a consequence of additional piping, booster pumps, and instrumentation and control requirements. Additionally, very high mixing gradients (600 to 1,000 sec$^{-1}$) are created in the downflow tube by the combined energy input of the ozone gas and the pressurized side stream flows, which can easily shear floc particles in settled water if the ozone contactor is installed downstream of coagulation and sedimentation water treatment processes. Based on those factors, that approach appears to be best suited for preoxidation (preozone) applications at the head of the treatment plant. At that location in the treatment process, raw water is typically pumped to the preozone contactor so higher head losses across the downflow tube will not impact the plant hydraulic grade line to any extent. Moreover, floc shearing is not a concern, since the ozone is applied upstream of any coagulation.

There have been recent advances in ozone generation technology by several equipment suppliers, and it is now possible to generate ozone at concentrations as high as 15% by weight. However, there still exists a need to develop a cost-effective ozone contacting device that is fully compatible with those equipment advances, and that can be used effectively for primary disinfection of drinking water. In particular, the inactivation of Cryptosporidium requires higher ozone concentrations and longer contact times than for the inactivation of other microorganisms of interest (e.g., Giardia and viruses). Consequently, careful attention to ozone mass transfer and homogeneous, two-phase mixing considerations in the ozone contactor are of critical importance.

It is an object of the present invention to provide a simplified and efficient apparatus for introducing low volumetric flows and high concentrations of ozone into water and for maintaining longer and more turbulent ozone-water contact for providing more complete disinfection of water.

SUMMARY OF THE INVENTION

Briefly stated, in accordance with one aspect of the present invention, apparatus is provided for introducing ozone into water for treatment for disinfection purposes. The apparatus includes a contactor vessel for receiving water to be treated, the vessel including a water inlet conduit for introducing untreated water into the vessel and a water outlet conduit for withdrawing treated water from the vessel. At least one diffusion chamber is provided within the contactor vessel and within which ozone is introduced into water to be treated, and at least one downflow tube having a longitudinal axis is positioned substantially vertically within the diffusion chamber. The downflow tube includes a water inlet and a water outlet, wherein the water outlet is positioned below the water inlet.

An ozone distributor is positioned within the downflow tube between the downflow tube water inlet and the downflow tube water outlet. The ozone distributor includes a plurality of porous elements in communication with a source of ozone for introducing ozone in fine bubble form into the downflow tube, the porous elements extending transversely within the downflow tube and lying in one or more spaced positions along the longitudinal axis of the downflow tube.

Preferably, at least one spacer which is connected to the ozone distributor, and which contacts the interior wall of the conduit, allows the distributor to be easily removed from and reinstalled into the conduit without damaging the porous elements.

In accordance with another aspect of the present invention, the downflow tube is J-shaped, and the contactor vessel includes a plurality of sequentially arranged ozone reaction cells through which ozonated water passes as the ozone disinfects the water being treated.

DESCRIPTION OF THE PREFERRED EMBODIMENTS

Figure 1:
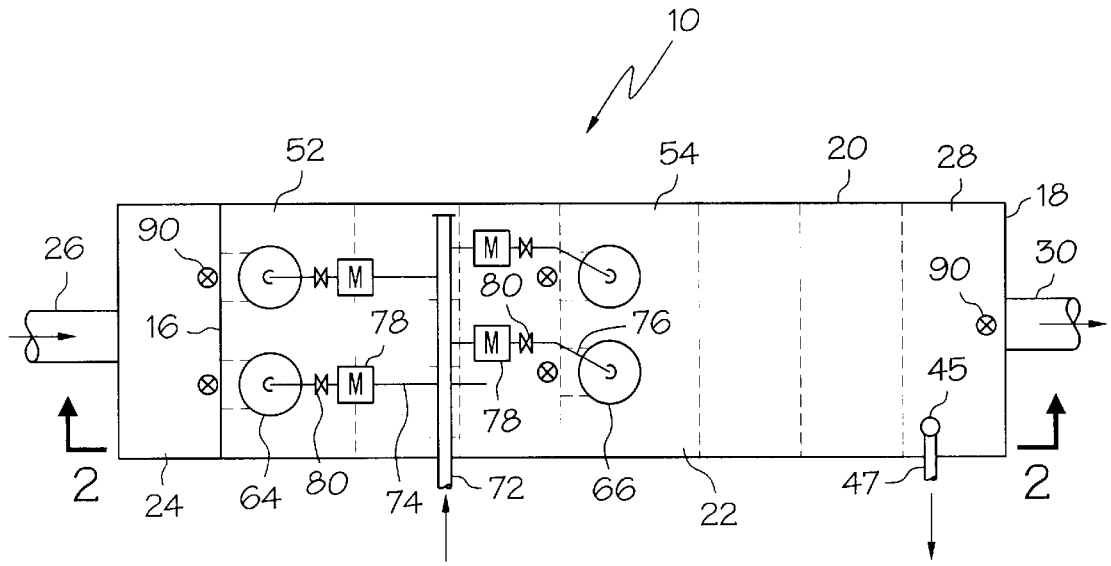
FIG. 1 is a top plan view of an ozone contactor in accordance with the present invention.
Figure 2:
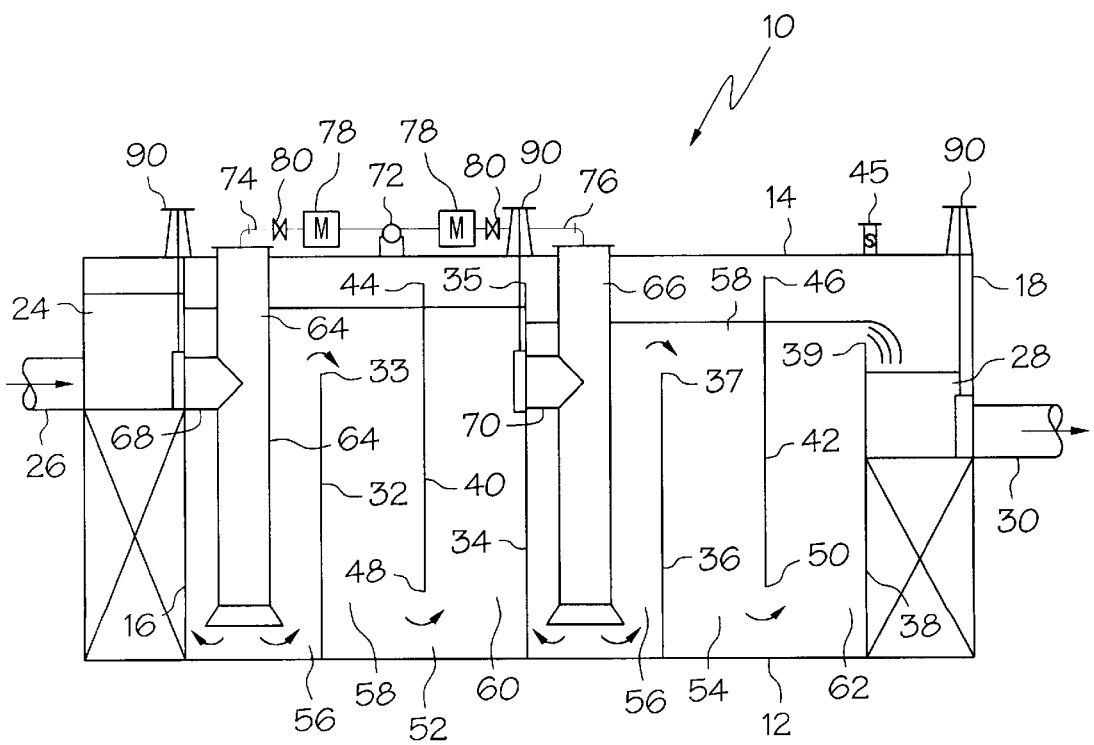
FIG. 2 is a side elevational view of the contactor of FIG. 1, taken along the line 2—2 thereof.

Referring now to the drawings, and particularly to FIGS. 1 and 2 thereof, there is shown a portion of a water treatment system that includes a closed ozone contactor vessel 10. Vessel 10 is of generally rectangular cross section, in each of the longitudinal, transverse, and vertical directions. Typically, vessel 10 is made of concrete, although other types of materials can also be employed.

Vessel 10 includes a bottom wall 12, a top wall 14, a pair of opposed end walls, 16, 18 and a pair of opposed side walls 20, 22. Adjacent the upper portion of end wall 16 is an inlet water chamber 24 that receives untreated water from an inlet conduit 26. Similarly, adjacent the upper portion of end wall 18 is an outlet water chamber 28 that receives treated water and that includes an outlet conduit 30. Untreated water inlet conduit 26 is so positioned that it introduces untreated water into the lower portion of inlet chamber 24 so that the untreated water enters chamber 24 through a submerged inlet. Outlet conduit 30 that extends from outlet chamber 28 is also so positioned that it is submerged with respect to water in chamber 28.

Several rectangular primary baffle members 32, 34, 36, and 38 extend upwardly from bottom wall 12 and extend transversely from and between side walls 20 and 22. Each of primary baffle members 32, 34, 36, and 38 extend upwardly from bottom wall 12 a distance less than the height of vessel 10, and their uppermost surfaces 33, 35, 37, and 39, respectively, are spaced above the operating water level of the contactor to direct the flowing water into an over-and-under flow pattern, as will be hereinafter described.

A pair of rectangular secondary baffle members 40, 42 extend transversely from and between side walls 20 and 22. The top surfaces 44, 46 of secondary baffle members 40, 42, respectively, are spaced below top wall 14, above the operating water level of the contactor. Similarly, bottom surfaces 48, 50 of secondary baffle members 40, 42, respectively, are spaced above bottom wall 12 to provide water passageways at the bottom of vessel 10. The spacing of the respective baffle members from the vessel top wall 14 provides a unitary upper area within vessel 10 to permit collection of free ozone (off gas) and other gases for venting through a vent conduit 45 that extends through upper wall 14 and that communicates with an ozone off-gas treatment system (not shown) through conduit 47.

Within vessel 10, the volume bounded by side walls 20 and 22 and by end wall 16 and primary baffle member 34 defines a first treatment chamber 52, and the volume bounded by side walls 20 and 22 and by primary baffle members 34 and 38 defines a second treatment chamber 54. As shown in FIG. 2, each of first and second treatment chambers 52, 54 includes an interior primary baffle member 32,36, respectively, and an interior secondary baffle member 40, 42, respectively.

Although the present description is based upon a total of two treatment chambers, it will be appreciated that the actual number of chambers can be different from two. The number will depend upon the flow rates and contact times necessary to achieve disinfection, and the ozone demand and decay rates of the water being treated. Further, although chambers 52 and 54 are shown as having substantially the same volume, it is not essential that that volumetric relationship be maintained, and it may be desirable in some instances to provide a larger chamber volume in the downstream stage of disinfection to allow additional contact time for disinfection after the initial ozone demand of the water is satisfied and an ozone residual is established in the first stage.

Weir 39 is provided so that the water flows over the weir to create sufficient turbulence to cause release of the ozone from the water. Such a weir would also serve to determine the water level in the upstream treatment chambers.

Each treatment chamber 52, 54 is divided into a diffusion chamber 56, 58, respectively, and immediately downstream thereof a reaction chamber 60, 62, respectively. Each diffusion chamber 56, 58 includes a substantially vertically extending downflow tube 64, 66, respectively, for receiving water through a transversely extending inlet tube 68, 70, respectively, and for introducing ozone into the water to be treated.

Ozone is provided to each of downflow tubes 64, 66 from an ozone header 72 that is in communication with a source (not shown) of ozone. Branch lines 74, 76 extend from ozone header 72 to respective downflow tubes 64, 66, and each branch line includes a flowmeter 78 and a flow control valve 80.

Figure 3:
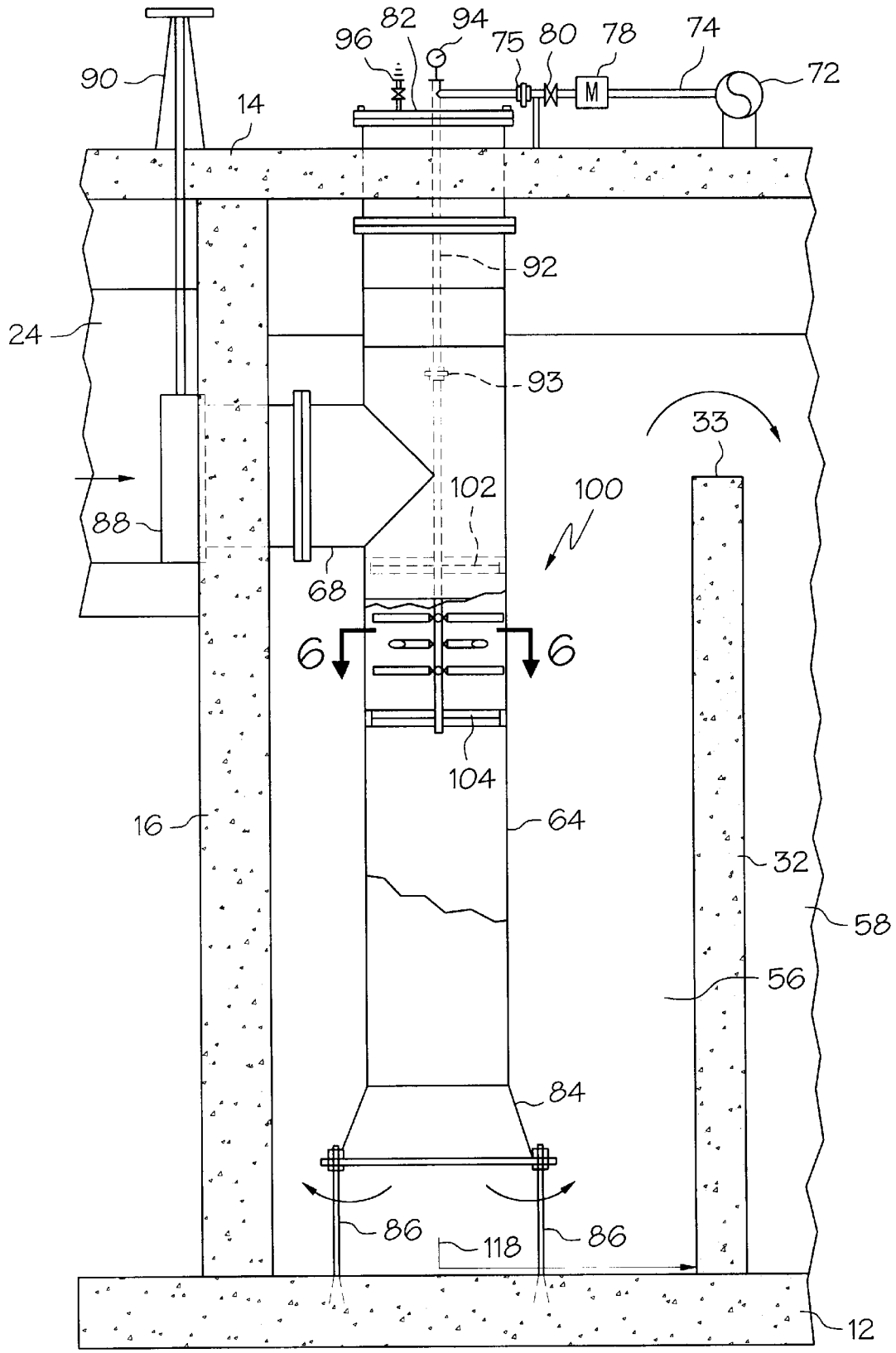
FIG. 3 is a vertical cross sectional view taken through a single cell of the ozone contactor shown in FIG. 1, partially broken away to show the structure of an ozone gas diffuser in accordance with the present invention.

Referring now to FIG. 3, downflow tube 64 extends through top wall 14 of vessel 10 and is closed at its upper end with a blind flange 82. At its lowermost end it is spaced from bottom wall 12 a distance sufficient to permit water to readily flow out of tube 64 through flared outlet 84, that is secured to bottom wall 12 by anchor bolts 86, or other suitable connection means. Inlet tube 68 communicates with inlet chamber 24 to enable untreated water to flow from chamber 24 into downflow tube 64. The rate of flow of water into inlet tube 68 is controlled by shifting the position of a vertically movable slide gate 88 through a slide gate operator 90 positioned on top wall 14.

Figure 5:
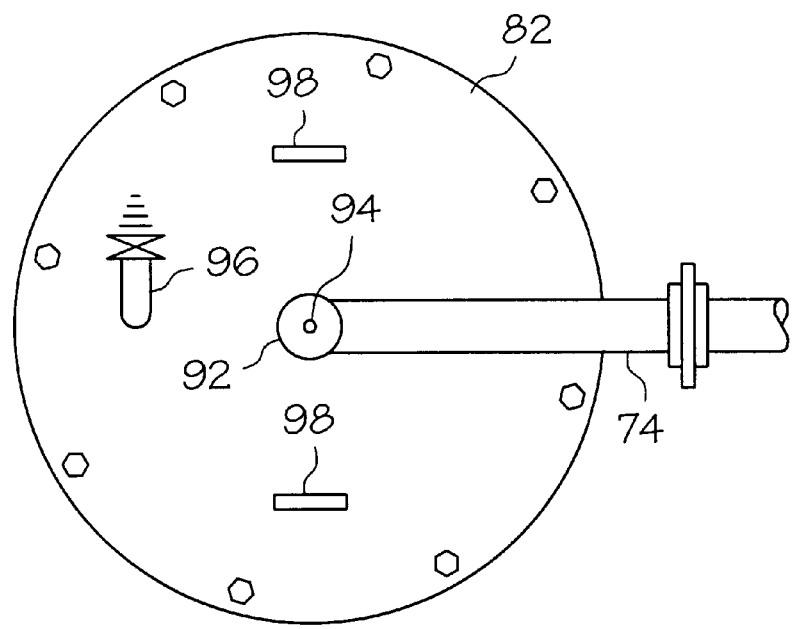
FIG. 5 is a top view of a downflow tube of the type shown in FIG. 3.

Branch line 74 extends from ozone header 72 to a vertically-extending ozone distribution conduit 92 that is substantially coaxial with downflow tube 64 and extends through the center of blind flange 82. Conduit 92 is welded to blind flange 82 to provide a gas-tight seal. A pressure gauge 94 can be provided at the uppermost end of conduit 92 to permit monitoring of the ozone pressure within conduit 92. Additionally, a sample tap 96 (also see FIG. 5) can be provided in blind flange 82 to enable determination of the ozone off-gas concentration in the upper end of downflow tube 64, and a pair of lifting eyes 98 enable lifting of blind flange 82 and the integrally connected ozone distribution conduit 92 when servicing the system. Preferably, branch line 74 includes a union 75, or the like, adjacent to blind flange 82 to permit disconnection of the ozone supply system from flange 82 for servicing purposes, and for withdrawal of diffuser elements in the manner hereinafter described.

Referring once again to FIG. 3, supported within downflow tube 64 by ozone distribution conduit 92, and at a height within tube 64 that is below inlet 68 to assure submergence in the flow path of the untreated water, is an ozone distributor 100 for distributing ozone gas within downflow tube 64. Distributor 100 is shown in enlarged detail in FIG. 4 and includes an upper spacer member 102 and a lower spacer member 104 that is spaced axially from spacer member 102. Each of spacer members 102, 104 include a plurality of radially-extending spokes 106 that terminate at an annular support ring 108, to the outermost surface of which is secured an annular spacer member 110 that preferably is made from an ozone-resistant synthetic resin material with a low coefficient of friction, such as polytetrafluoroethylene, or the like. Annular spacer member 110 preferably has a smooth, rounded peripheral face, which contacts the interior wall of downflow tube 64 at a single contact point. Spacer members 102, 104 serve to support distribution conduit 92 and ozone distributor 100 in a fixed, substantially central position within downflow tube 64. They also permit the ozone distributor 100 to be easily removed from downflow tube 64 by removing blind flange 82 and pulling distribution conduit 92 upwardly, and in so doing sliding spacer member 110 along the inner wall of downflow tube 64. Preferably, distribution conduit 92 includes a union 93, or the like, to allow conduit 92 to be disassembled as the ozone distributor 100 is lifted out of the downflow tube, particularly in situations where there is limited clearance above the contactor vessel.

Extending substantially radially outwardly from distribution conduit 92 are a plurality of porous ceramic distributor elements 112 that are in communication with the interior of distribution conduit 92 through radial connecting conduits 114. Porous elements 112 are preferably rod-type, cylindrical, fine bubble ceramic diffusers that are in communication with respective conduits 114 by preferably threaded connections to enable ozone to flow from within distribution conduit 92 through conduits 114 to and through the respective porous elements 112, so that the ozone emanates from the porous elements in the form of fine bubbles that are substantially uniformly distributed in the transverse direction of the downflow tube. Water that is displaced by gaseous ozone within distribution conduit 92 is expelled through the open lowermost end 116.

Figure 4:
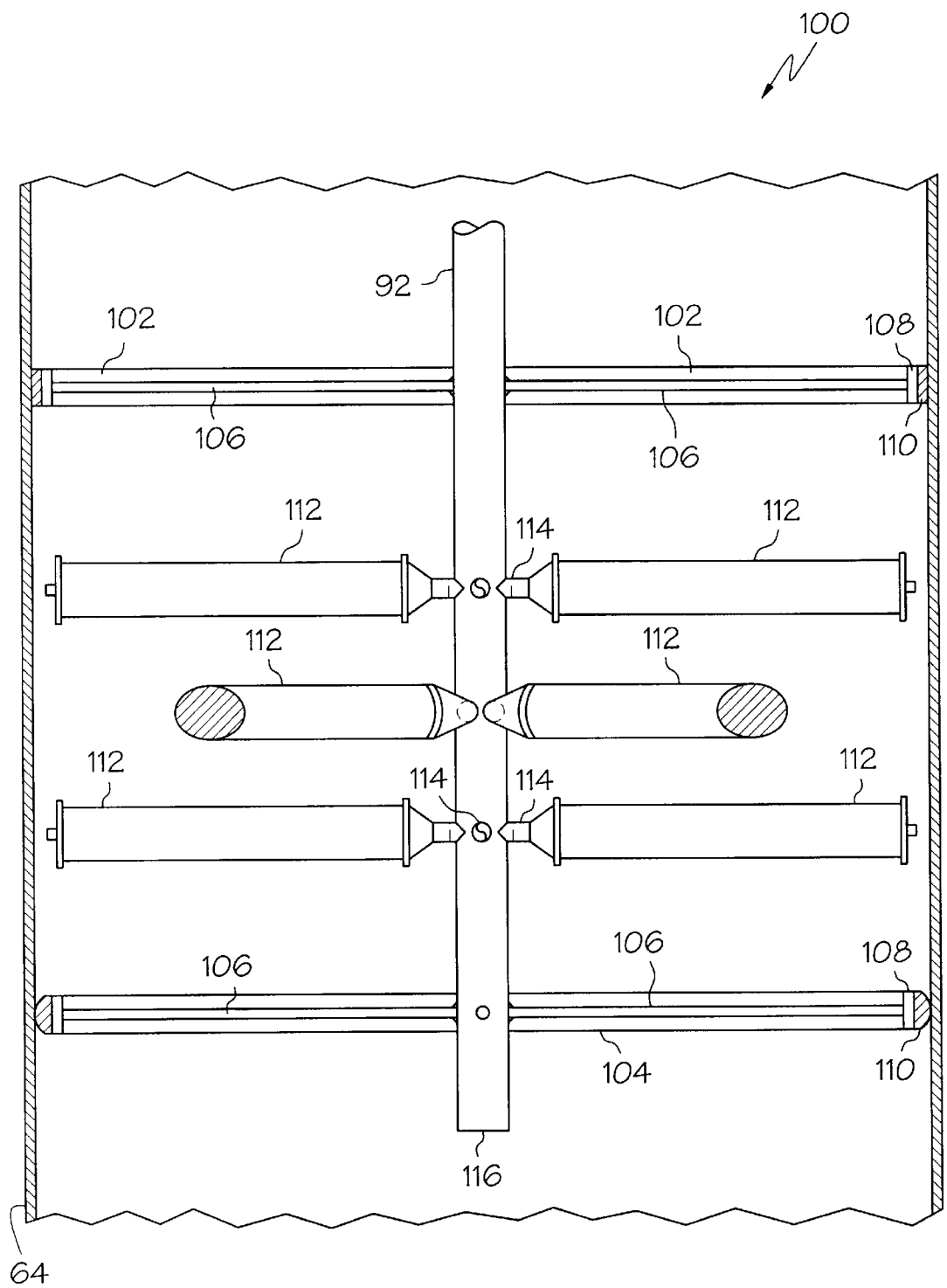
FIG. 4 is an enlarged, fragmentary view of an ozone gas diffuser of the type shown in FIG. 3.
Figure 6:
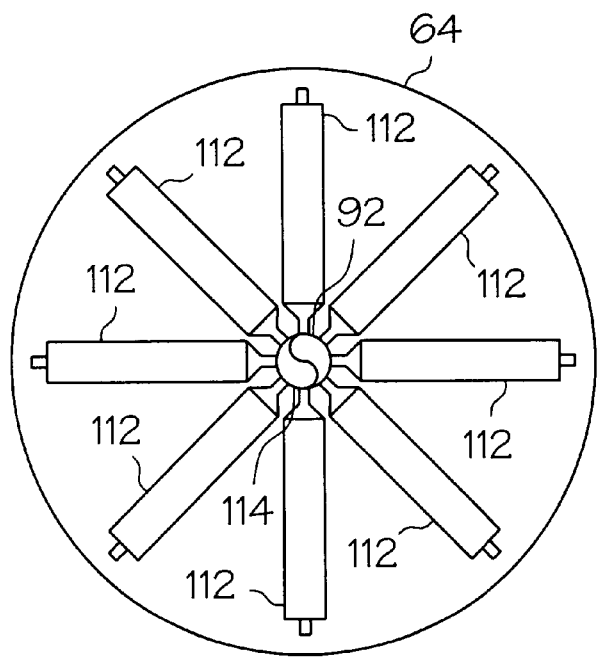
FIG. 6 is a cross-sectional view of the downflow tube shown in FIG. 3, taken along the line 6—6 thereof.

As shown in FIG. 4, a plurality of radial arrays of porous elements are provided in axially spaced relationship along distribution conduit 92 to provide substantially uniform ozone distribution across the interior of downflow tube 64. Each radial array shown includes four porous elements 112 spaced angularly from each other by 90°. Each radial array is preferably also angularly offset from the adjacent radial array by about 45°, as shown in FIG. 6, again, to provide substantially uniform distribution of ozone from respective porous elements 112 into the water as it flows through downflow tube 64. Preferably, at least two such radial arrays are provided, although three arrays, as shown in FIGS. 3 and 4, or even more, may be required for the dissolution of higher volumetric ozone gas flows.

The number of individual layers of porous elements that are operative at any one time can be changed by changing the volumetric gas flow, and therefore the pressure, of the ozone entering distribution conduit 92. Higher pressures will tend to lower the water level within conduit 92, to cause ozone to flow into a particular layer of porous elements. Similarly, decreasing the ozone pressure will tend to raise the water level within conduit 92 and thereby seal off one or more layers of porous elements from the ozone, thereby reducing the volume of ozone entering downflow tube 64. The use of multiple layers of porous elements connected to vertically disposed distribution conduit 92 significantly increases the effective operating range of the diffuser system.

Figure 7:
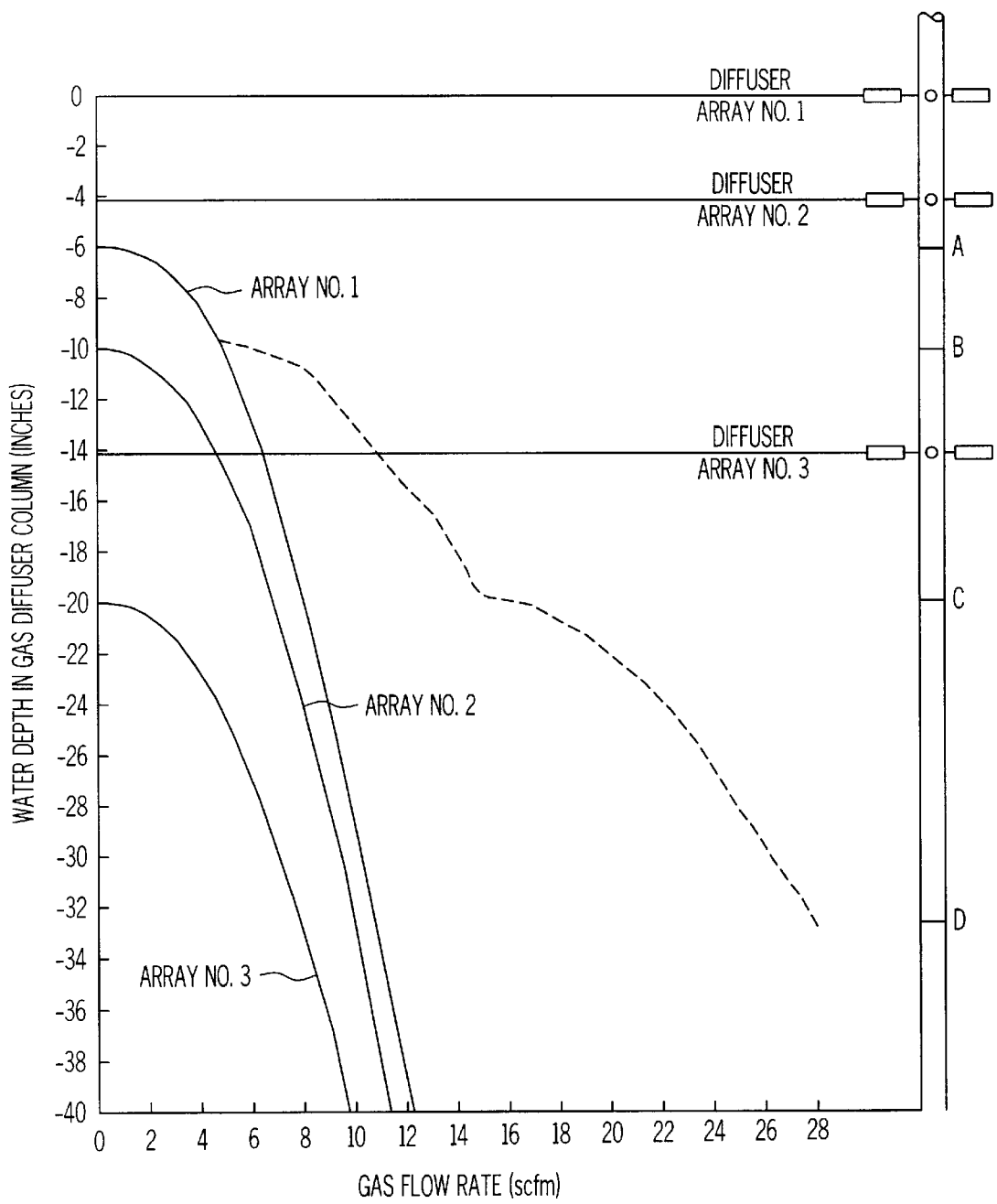
FIG. 7 is a graph showing the estimated water depth and gas flow rate in a downflow tube having three longitudinally spaced ozone gas diffuser elements.

The gas flow turndown with an arrangement of the type herein disclosed is at least three times higher than for individual porous elements. FIG. 7 shows estimated performance curves for a single-stage, a two-stage, and a three-stage vertical diffuser arrangement at ozone gas flow rate ranges of from 1.75 to 28 scfm. The three stages are located at different depths within the downflow tube and along the distribution conduit, as shown on the right side of FIG. 7, and the individual performance curves are shown in solid lines on the adjacent graph.

The dashed line in FIG. 7 represents the combined performance curve obtained by summing the individual performance curves for each diffuser array. The combined curve for a particular design can be tailored to meet specific ozone demand conditions (e.g., a year-round baseline demand with short duration peaks during the summer months) by staggering the diffuser arrays along the downflow tube.

Preferably, a minimum of two diffuser arrays is provided, each with four rod-type diffuser elements, with the lower array rotated 90° from the upper array to provide coverage of the internal cross-sectional area of the downflow tube.

The particular rod-type diffuser elements for the FIG. 7 performance curves will deliver a minimum capacity of 0.5 scfm. for a four element diffuser array, at an initial head loss of 17 inches water column. The upper diffuser array of the three-stage configuration will deliver the required minimum gas flow for the illustrated design. By spacing the middle and lower diffuser arrays at successively lower depths, the gas flows delivered to the downflow tube will be approximately doubled and tripled to meet the high end of the gas flow range (10 to 13 scfm), without exceeding a maximum head loss of 38 inches of water across the diffuser array. That result is possible because the water level in the distribution conduit drops as gas flow is increased to meet increasing ozone demands. The lowest water level in the distribution conduit occurs at the maximum design gas flow rate (13 scfm). The distribution conduit should preferably extend approximately 12 inches below that level to provide a water seal so that ozone gas is not released through the distribution pipe outlet.

Because of the structure of distributor 100 and the manner in which it is supported within downflow tube 64, distributor 100 can be quickly and easily removed from tube 64 for inspection or for replacement of the porous elements. Such replacement can be made without interruption of the ozone treatment operation when two such downflow tubes 64 are provided in a single treatment chamber, as shown in FIG. 1. As one distributor is being serviced, the other continues to operate, at twice the flow rate, thereby minimizing treatment system downtime. Moreover, in addition to reducing downtime, provision of multiple downflow tubes assures more uniform ozone distribution across a treatment chamber.

As shown in FIGS. 1 and 2, plural treatment chambers can be provided in series with each other to provide sufficient contact time for the desired degree of disinfection. Also as shown, each treatment chamber preferably includes a pair of downflow tubes, and each downflow tube includes an individual inlet slide gate to permit any tube to be isolated for inspection or servicing of the ozone distributor. The residual ozone concentration at the outlet of downflow tube 64 can be monitored by using a sample tap 118 (see FIG. 3).

In operation, the respective downflow tubes 64 are sized to maintain adequate downflow velocities so that ozone gas bubbles that emanate from the ozone distributor 100 are entrained by the water flow under stable two-phase flow conditions. Ozonated water exits from the downflow tube outlet 84 near the floor of the diffusion chamber 56, and flows outwardly along the vessel bottom wall 12 and then upward through chamber 56. The ozonated water then passes over baffle 34, into reaction chamber 60, and then under secondary baffle 40 to inlet tube 70 of second treatment chamber 54, where the flow sequence is repeated.

During operation of the system, the superficial velocity should be greater than about 2.5 fps. to entrain gas bubbles with the downward flow stream, and should preferably not exceed 6.0 fps in order to avoid bubble coring and excessive hydraulic head losses. Therefore, a 3:1 flow turndown per downflow tube can be achieved. If two downflow tubes are provided in each diffusion chamber a 6:1 flow turndown can be achieved, provided that a single tube is employed at low water flow rates.

The overall performance of the diffusers can be determined without opening the downflow tube by monitoring the pressure gauge positioned at the top of the ozone distribution conduit. Increasing pressure readings in the distribution conduit at a given gas flow rate indicate a clogged diffuser; whereas decreasing pressure readings indicate leaky diffuser gaskets.

The confined head space at the top of the downflow tube provides ample space to entrap rising gas bubbles when flow to the downflow tube is stopped; the ozone off gas is easily removed by attaching a portable vacuum pump (not shown) to the sample tap located on the blind flange at the top of the tube.

The use of high ozone concentrations in the feed gas coupled with low ozone demand can lead to very low gas flow rates delivered to the contactor. If the contactor diffusion chamber is not properly designed, low gas flow rates can result in inadequate gas-liquid mixing and ineffective disinfection. The present invention resolves that problem by confining ozone gas flows to the relatively small water column formed within the downflow tube. By doing so, turbulent and uniform mixing conditions can be maintained in the downflow tube for effective disinfection of water.

Referring now to FIGS. 8 through 11, there is shown an alternative structural embodiment of an ozone contactor vessel 200 for treatment of drinking water or wastewater at high ozone concentrations and low volumetric gas flow rates. Vessel 200 includes a plurality of vertically-extending, J-shaped downflow tubes 202 that each include an interiorly-positioned fine-bubble ozone distributor having the general configuration disclosed earlier herein and incorporating porous elements for introducing ozone gas in fine bubble form into the water that passes through the downflow tubes and through the contactor vessel. The disclosed arrangement overcomes the inefficient mixing conditions that exist in conventional fine-bubble diffuser systems at higher ozone concentrations by creating turbulent gas-liquid mixing conditions inside the J-tubes, which increases ozone mass transfer rates, ozone residual formation, and the contact time available for disinfection—all at a lower cost than alternative dissolution systems.

Figure 8:
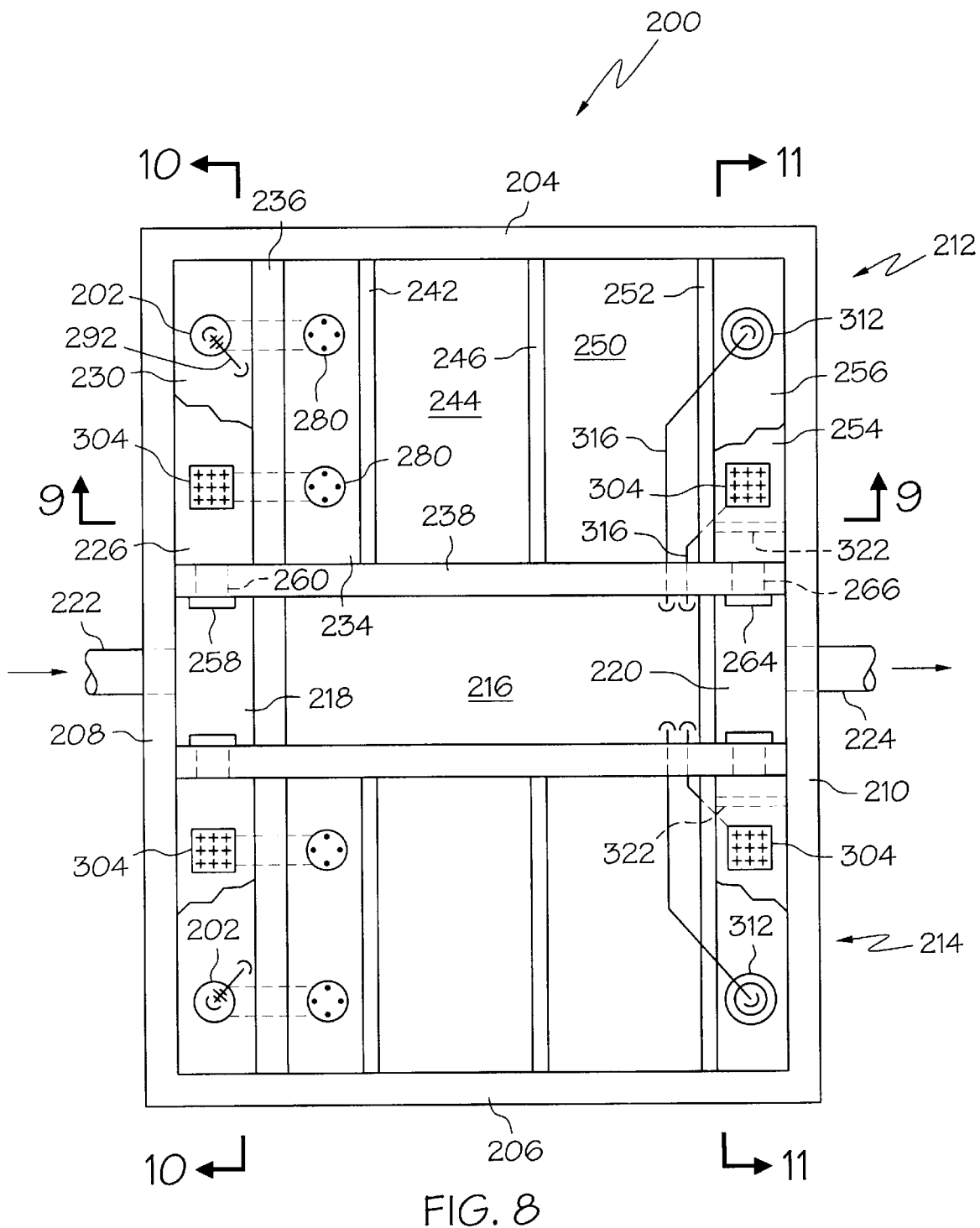
FIG. 8 is a top plan view of another embodiment of an ozone contactor vessel in accordance with the present invention, with the vessel top wall partially broken away, and incorporating a J-shaped downflow tube that includes a multistage ozone distributor.

Vessel 200 is of generally rectangular configuration, both in plan and in elevation, and as best seen in the plan view of FIG. 8 it includes a pair of opposed side walls 204, 206 and a pair of opposed end walls 208, 210. The interior of vessel 200 includes two parallel ozone contactors 212 and 214 that are spaced from each other by an elongated, narrow contactor gallery 216, which serves for housing instrumentation, sample piping, and process piping for conveying and regulating the flow of ozone gas and ozone-quenching chemicals. Also positioned between contactors 212 and 214 are a water inlet distribution channel 218 and a water outlet collection channel 220. Water inlet distribution channel 218 is in communication with a water inlet pipe 222 for conveying untreated water to vessel 200. Water outlet collector channel 220 is in communication with a water outlet pipe 224 that conveys treated water from vessel 200 to a downstream treatment process or pumping station (not shown).

Each of ozone contactors 212 and 214 is of similar configuration and construction. Accordingly, it should be understood that the following description of first contactor 212 applies with equal effect to second contactor 214.

Figure 9:
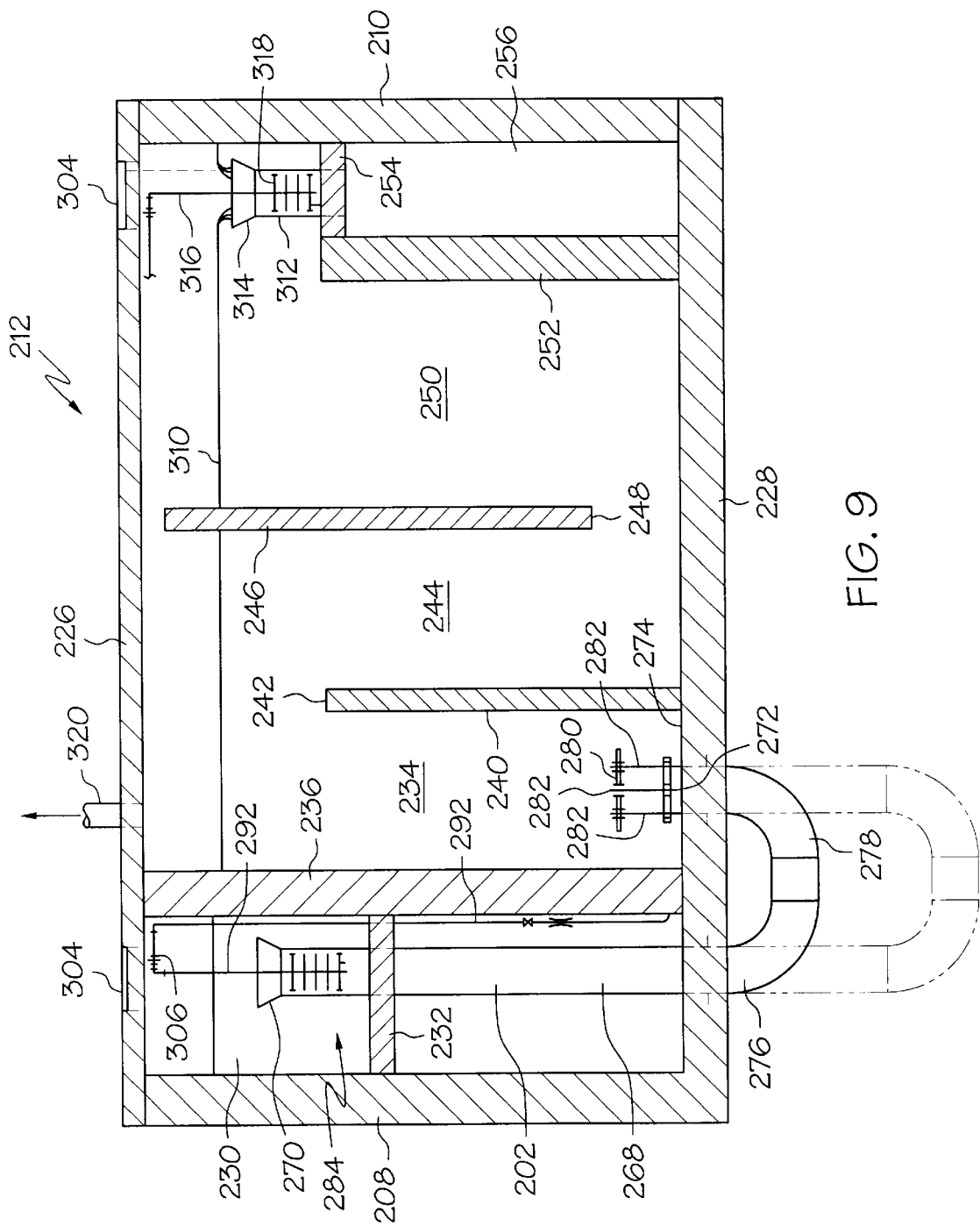
FIG. 9 is a cross-sectional view taken along the line 9—9 of FIG. 8.
Figure 10:
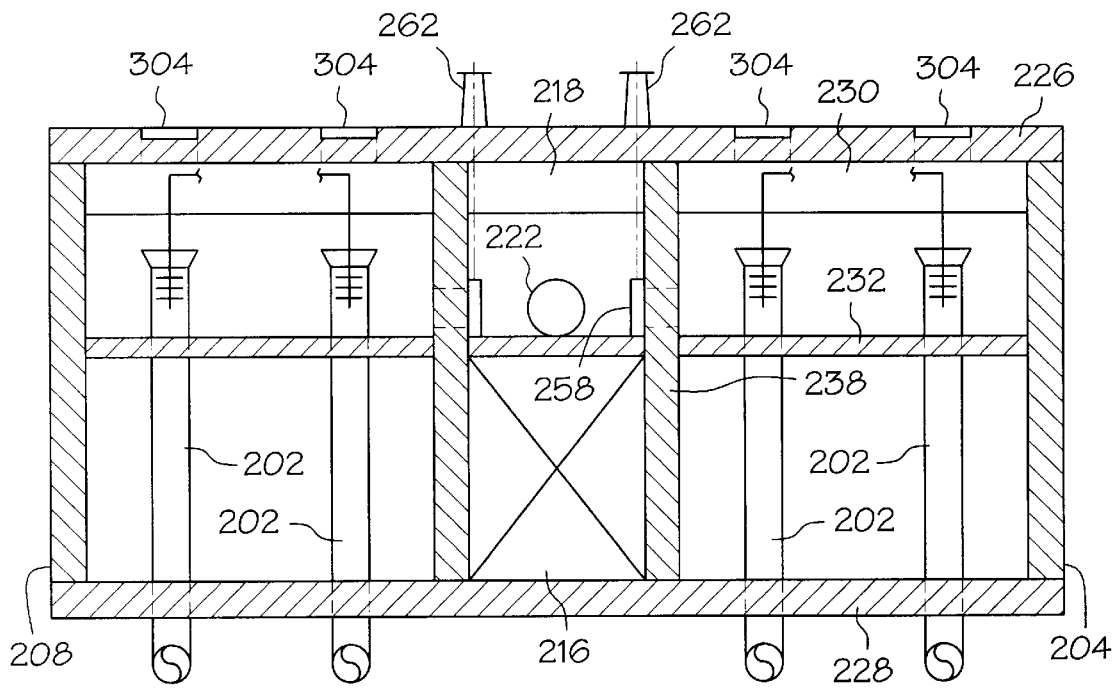
FIG. 10 is cross-sectional view taken along the line 10—10 of FIG. 8.
Figure 11:
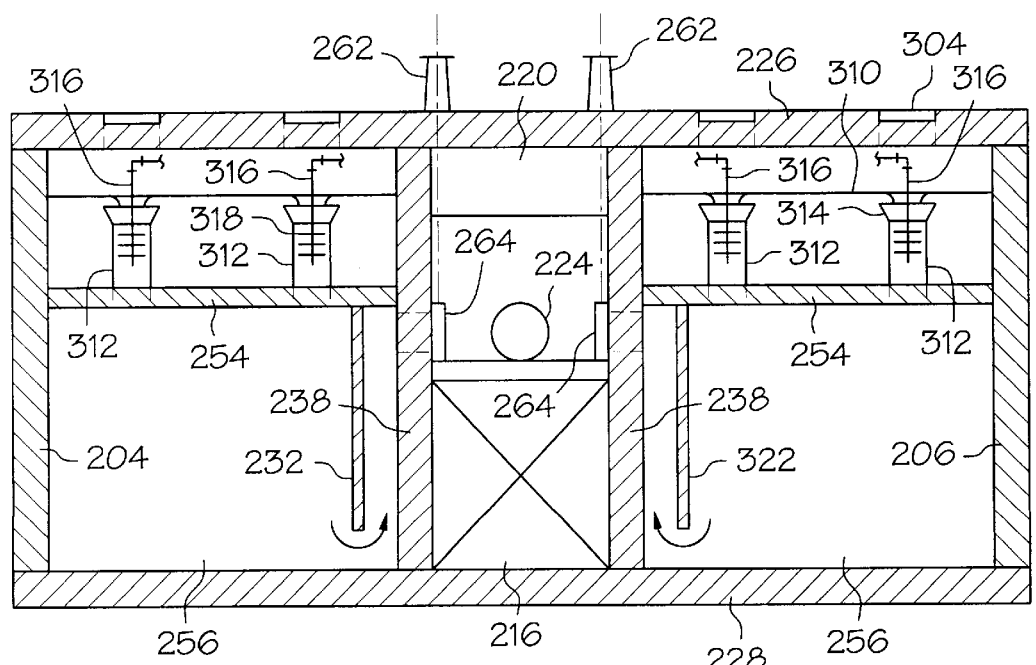
FIG. 11 is a cross-sectional view taken along the line 11—11 of FIG. 8.

Referring now to FIG. 9, which is a cross-sectional view through vessel 200, first contactor 212 includes a top wall 226 and a bottom wall 228 to define a closed vessel. Cell 212 includes a closed, untreated water inlet channel 230 having a predetermined depth below cell top wall 226, as defined by channel bottom wall 232. Immediately adjacent inlet channel 230 is a first diffusion cell or ozone reaction cell 234 that is separated from inlet channel 230 by vertical wall 236 that extends laterally across contactor 212. First ozone reaction cell 234 is defined by wall 236, cell side walls 204 and 238 (see FIG. 8), cell bottom wall 228, and primary baffle member 240, which extends upwardly from cell bottom wall 228 and terminates at upper edge 242, which is spaced from top wall 226 to define a weir over which the water undergoing treatment passes.

A second diffusion cell or ozone reaction cell 244 is adjacent first ozone reaction cell 234 and is separated therefrom by primary baffle member 240. Second ozone reaction cell 244 is defined by primary baffle member 240, cell side walls 204, 238, cell bottom wall 228, and a secondary baffle member 246, which extends laterally across contactor 212 from a point below cell top wall 226 to a point spaced above cell bottom wall 228 at a lower edge to define a submerged weir under which the water undergoing treatment passes.

A third diffusion cell or ozone reaction cell 250 is adjacent second ozone reaction cell 244 and is separated therefrom by secondary baffle member 246. Third ozone reaction cell 250 is defined by secondary baffle member 246, cell side walls 204, 238, cell bottom wall 228, and outlet cell wall 252, which extends laterally across contactor 212 from cell bottom wall 228 to a point spaced downwardly from cell top wall 226. A horizontal wall 254 extends generally horizontally from the upper end of outlet cell wall 252 to contactor end wall 210 to define an ozone quenching outlet cell 256. If desired, additional diffusion cells or ozone reaction cells, separated by suitable baffle members, can be provided to provide longer contact times for ozone disinfection applications.

In each instance, inlet channel 230, ozone reaction cells 234, 244, 250, and ozone quenching outlet cell 256 are shown as of generally rectangular form, although they can also be made in other forms, as desired. However, each of the component cells that together define first contactor 212 is sequentially arranged so that water can flow from one of the cells into an adjacent downstream cell based upon the depth of the water that is contained in the inlet channel and the rate of throughflow of water undergoing treatment.

Referring once again to FIG. 8, an inlet gate 258 is provided between inlet distribution channel 218 and inlet channel 230 of ozone contactor 212 to vary the open area of passageway 260 and thereby the flow into inlet channel 230. The operation of inlet gate 258 can be by any conventional means known to those having skill in the art, such as a gate operator shown generally in FIG. 10. Similarly, an outlet gate 264 is provided between outlet cell 256 and outlet collection channel 220, again, operable by a gate operator 262, to allow variation of the open area of passageway 266 and thereby enable control over the rate of flow of treated water from ozone quenching outlet cell 256 to outlet collection channel 220 and into vessel outlet pipe 224.

As best seen in FIG. 9, extending between inlet channel 230 and ozone reaction cell 234 is a vertically disposed downflow tube 202 that is formed in the shape of a "J." Downflow tube 202 includes a first vertical leg 268 having an outwardly flared inlet opening 270 that opens into inlet channel 230 at a point above channel bottom wall 232. A second vertical leg 272, shorter in axial length than first vertical leg 268, extends upwardly through cell bottom wall 228 and terminates at an outlet opening 274 at a point spaced above bottom wall 228. As shown in FIG. 9, each of vertical legs 268, 274 of downflow tube 202 extends below bottom wall 228 of contactor vessel 200 so that each of 90° curved elbow portions 276, 278 of downflow tube 202, that interconnect the respective vertical legs 268, 274 lie at a point below bottom wall 228. Downflow tube 202 must be so sized to maintain adequate downflow water velocities (2.5 to 6.0 fps) so that gas bubbles are entrained by the flowing water under stable, two-phase flow conditions without excessive head loss. A minimum of two downflow tubes 202 are preferably provided in ozone contactor 212 to provide good flow distribution across the width of contactor 212. In addition, if isolation valves (not shown) are installed in downflow tubes 202, one downflow tube can be shut down for inspecting an associated multi-stage diffuser assembly while the other tube can continue to operate at twice its normal water flow rate.

As represented by the dashed lines in FIG. 9, the overall length of downflow tube 202 can be changed, as desired, depending upon the desired hydraulic static pressure and the residence time of the ozone in the untreated water that passes through the downflow tube from inlet distribution channel 218 to first ozone reaction cell 234. The vertical length can be selected to enable the J-tube to be utilized in shallow contactors, or in retrofit applications in existing sedimentation basins, by extending the vertical length of the J-tube well below contactor bottom wall 228 in order to provide sufficient static water pressure in the downflow tube (preferably from about 25 to about 30 feet) for achieving high ozone mass transfer rates. The J-tube piping arrangement, including the 180° long radius bend formed from elbows 276 and 278, also permits a cement-lining machine to be used to line the interior of the ductile iron piping and to maintain the cement lining over the operating life of the ozone contactor.

Preferably, a stainless steel deflector plate 280 is positioned in spaced relationship from outlet opening 274 of downflow tube 202 in order to distribute the outlet flow of water and entrained ozone bubbles in a lateral direction, to minimize short-circuiting of the flow within cell 234, and thereby maximize the time the outlet flow from downflow tube 202 is within ozone reaction cell 234. As shown in FIG. 9, deflector plate 280, which preferably has a slightly larger diameter than that of outlet opening 274 to enhance lateral flow distribution, is spaced approximately one to three feet above outlet opening 274 by means of a plurality of threaded rod supports 282. The proper spacing is a function of the design flow rate through the J-tube and should be selected to provide good lateral flow distribution, while minimizing excessive head losses across the outlet.

Figure 12:
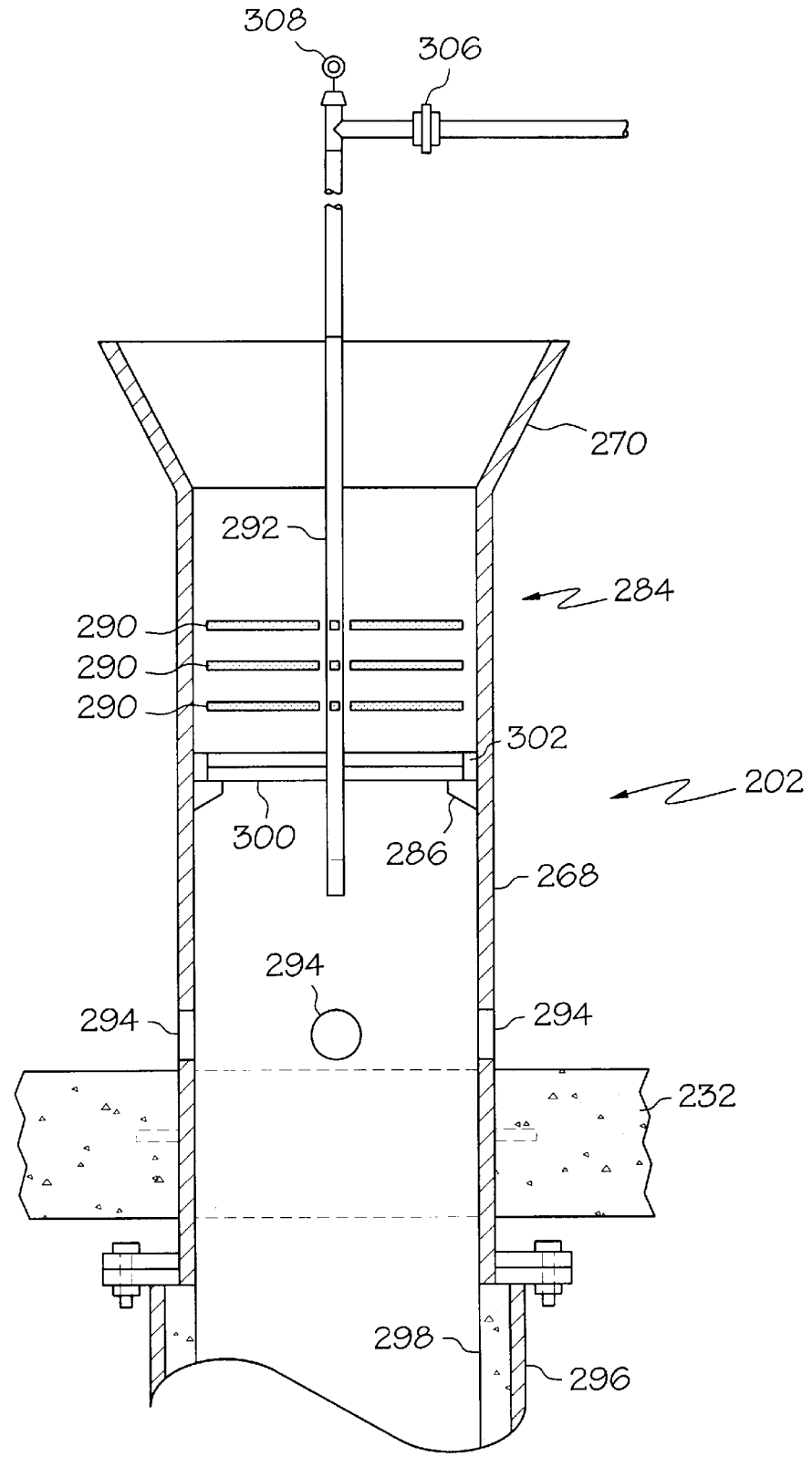
FIG. 12 is an enlarged, fragmentary view of a downflow tube inlet section showing a multi-stage ozone distributor positioned within the downflow tube.

An ozone distributor 284 is shown generally within a downflow tube in FIG. 9, and in enlarged form in FIG. 12. Structurally and functionally, ozone distributor 284 for this embodiment is similar to ozone distributor 100 described hereinabove in connection with the embodiment shown in FIGS. 1 through 7. However, in this second embodiment of the invention, ozone distributor 284 is positioned close to flared inlet 270 of downflow tube 202, which includes an inner, annular, stainless steel shelf 286 to support a generally radially extending diffuser assembly centralizer ring 288.

Although at least two closely-spaced, horizontal arrays of porous diffuser elements, defining two ozone introduction stages, are preferred, ozone distributor 284 shown in FIG. 12 includes a three-stage diffuser assembly composed of three axially spaced layers of porous diffuser elements, each layer preferably containing four rod-type, ceramic, radially-extending fine bubble diffuser elements 290, positioned 90° apart from each other, and that communicate with gas distribution conduit 292 to provide a multiplicity of fine bubbles of ozone that are entrained within the water that flows through downflow tube 202.

Also as shown in FIG. 12, downflow tube 202 preferably includes drain openings 294 that are drilled into the inlet portion of downflow tube 202, just above channel bottom wall 232, to allow water in inlet channel 230 to be drained through downflow tube 202 into the adjoining reaction cell 234 when that particular contactor is removed from service and dewatered.

Although the inlet portion of downflow tube 202 that is exposed to contact with ozone gas is made from stainless steel, at a point below inlet channel bottom wall 232 the downflow tube section 296 can be formed from less expensive ductile iron, but it must include an ozone-resistant lining 298, such as a cement lining, to prevent direct contact between the ozone and the ductile iron. Second vertical leg 272 of downflow tube 202 is also made from stainless steel because of the ozone-containing water surrounding it.

Ozone distributor 284 can be easily removed from downflow tube 202 for inspecting or replacing porous elements 290 and without disrupting ozone treatment operations, as long as at least two downflow tubes (with isolation valves—not shown) are provided in each diffusion chamber. To facilitate removal and assure proper alignment of ozone distributor 284 relative to downflow tube 202, a stainless steel spacer ring 300 is carried by gas conduit 292 at a point below the multistage diffuser arrays. Ring 300 includes an outer rim 302 made from ozone-resistant polytetrafluoroethylene, or the like, which contacts the inside surface of downflow tube 202. The entire ozone distributor can slide vertically within downflow tube 202 to maintain the correct alignment of gas conduit 292 and diffuser elements 290. Removable hatches are provided in vessel top wall 226 to permit removal of the ozone distributors for inspection or servicing.

As seen in FIG. 9, the ozone supply gas piping for multi-stage ozone distributor 284 is routed from contactor gallery 216, along vertical wall 236, through inlet channel 230, along the underside of top wall 226 adjacent hatch 304 located directly above J-tube 202, and into the open-ended J-tube, where it forms gas conduit 292 for ozone distributor 284. A union 306 (or some other releasable coupling) is provided in the gas piping below hatch 304 to permit disengagement of ozone distributor 284 from the upstream gas piping system. An eye bolt 308 (see FIG. 12) can be provided at the top of ozone distributor 284 to allow it to be easily lifted through hatch 304. Ozone distributor 284 can be removed through hatch 304 without the need to dewater ozone contactor 212 or inlet channel 230.

Referring once again to FIG. 9, upper horizontal wall 254 of ozone quenching outlet cell 256 is at a level below the level 310 of the water within ozone reaction cell 250. An inlet conduit 312 extends upwardly from and is in communication with quenching outlet cell 256. Conduit 312 includes an outwardly flared open inlet end 314 that is positioned at an elevation to maintain operating water level 310 within ozone reaction cell 250. Within inlet conduit 312 is a quenching chemical supply pipe 316 and a suitable chemical distributor 318, such as a perforated pipe, for introducing ozone quenching chemicals to the water entering outlet cell 256 to treat the water by eliminating residual ozone that may be present. Quenching chemicals, such as sulfur dioxide, sodium bisulfate, or hydrogen peroxide, can be introduced into the ozonated water through a perforated pipe diffuser (not shown) that is suspended in conduit 312. The available contact time between the quenching chemicals and the water within cell 256 allows the completion of quenching or advanced oxidation process reactions before the treated water is discharged from vessel 200. In that regard, a downwardly extending wall 322 is provided within outlet cell 256 to increase the residence time of the water and to assure completion of the quenching reactions before discharge of the treated water.

In operation, water to be treated enters contactor vessel 200 through inlet pipe 222 and flows into inlet distribution channel 218 positioned between the respective ozone contactors 212 and 214. The untreated inlet water then flows through the inlet gates 258 into the inlet channels 230 of the respective cells. When sufficient untreated water has entered the inlet channels it ultimately reaches a level higher than that of flared inlet opening 270 of downflow tube 202 and flows into the downflow tube. As the untreated water flows past ozone distributor 284, ozone gas from a source of gaseous ozone (not shown) is introduced into the water in fine bubble form through porous elements 290 that are part of the multi-stage ozone distributor. Because the velocity of the water flowing within downflow tube 202 and past ozone distributor 284 is sufficiently high, the entrained ozone bubbles are carried downwardly along downflow tube 202 by the water as it travels along first vertical leg 262 of the downflow tube, around the respective elbow portions 276 and 278 of the downflow tube, upwardly along second vertical leg 272 of the downflow tube, and out outlet opening 274. Deflector plate 280 causes the outflow from downflow tube 202 to spread laterally outwardly in a radial direction relative to the axis of outlet opening 274 to thereby distribute the water and entrained ozone laterally within and across the lowermost portion of reaction cell 234.

The water and entrained ozone then flow upwardly within first reaction cell 234, during which time the ozone gas serves to disinfect the water. Water with entrained ozone then spills over upper edge 242 of primary baffle member 240 and into second ozone reaction cell 244, where continued contact is effected between the ozone and constituents in the water. Thereafter, the flow of water with some still-entrained ozone continues in a downward direction within second ozone reaction cell 244 toward the base of contactor 212, around lowermost edge 248 of secondary baffle member 246, and into third ozone reaction cell 250 where continued interaction of the ozone and any remaining constituents in the water takes place. Any ozone gas that is liberated from the water as it passes within and between the several cells escapes from vessel 200 through an off-gas outlet pipe 320 that passes through top wall 220 of vessel 200 for subsequent collection.

Water with some remaining entrained ozone mixes within third ozone reaction cell 250 and ultimately flows from the third ozone reaction cell into inlet opening 314 of inlet conduit 312. Positioned within inlet conduit 312 is quenching chemical supply distributor 318, by means of which the ozone-quenching chemicals are introduced into the water entering outlet cell 256 in order to react with and to eliminate any remaining free ozone. The so-treated water then enters ozone quenching outlet cell 256 to continue to mix with the quenching chemicals, and it then enters outlet collection channel 220 to flow from vessel 200 through outlet pipe 224.

Figure 13:
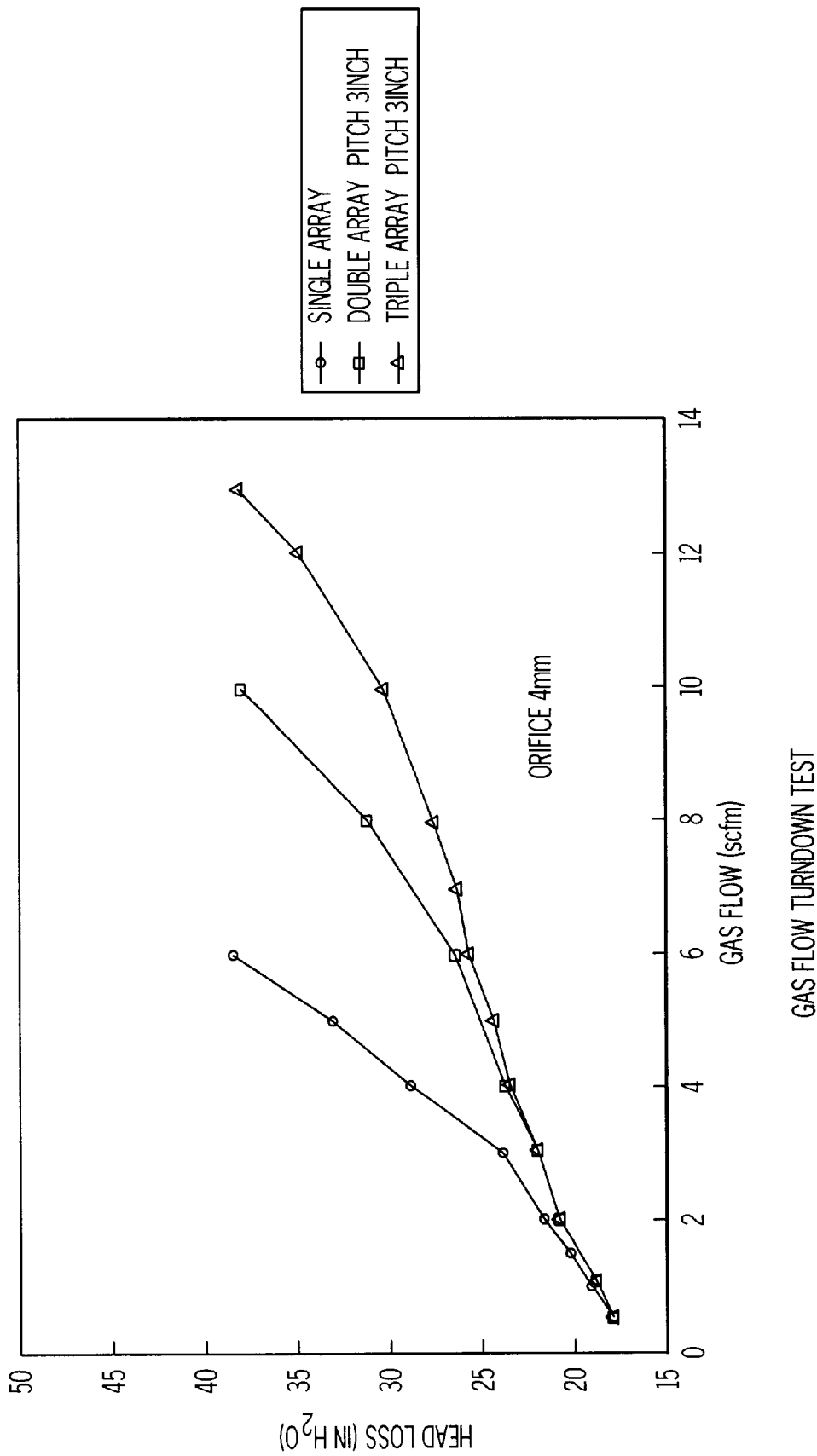
FIG. 13 is a graph showing the head loss versus gas flow for several diffuser array configurations.

FIG. 13 shows the results of tests conducted to determine the effect of varying the number of arrays of diffuser stages that are operative within the downflow tube. The graph is based upon a predetermined axial spacing of the respective arrays along the downflow tube longitudinal axis, three inches in the case shown. As shown, the gas flow at a particular head loss is shown for a single array, for a double array, and for a triple array, wherein each of the arrays is spaced from the adjacent array at a spacing of three inches in an axial direction along the downflow tube. As is apparent from FIG. 13, multiple diffuser arrays significantly increase the gas flow turndown ratio as compared with a single diffuser array. Assuming a maximum allowable head loss of 30 inches, which is selected to avoid ozone bubble shearing, the results indicate the following gas flow turndown ratios: single array—8:1; double array—15:1; and triple array—20:1. Thus, a multistage diffuser arrangement permits much wider operating ranges for the contactor vessel so that the ozone introduction system can respond effectively to sudden changes in plant flow rates or to water quality changes, while maintaining fine gas bubble sizes and high ozone mass transfer rates.

As will be apparent to those skilled in the art, the J-tube embodiment of the present invention provides a number of beneficial results, including lower capital costs by eliminating booster pumping and associated piping, by reducing the number of fine-bubble diffusers, by eliminating a large horizontal diffuser piping grid, and by enabling the use of cement-lined ductile iron piping in lieu of stainless steel for the J-tube. Additionally, the J-tube arrangement can be used in conjunction with shallow-depth ozone contactor vessels, either to retrofit them or to reduce initial construction costs for dewatering, for rock excavation, or for multiple-lift concrete pours, without compromising ozone mass transfer rates. Moreover, the J-tube arrangement can be used in conjunction with deep contactor vessels to minimize the overall contactor footprint, to reduce land costs, or to accommodate particular site constraints, without increasing the back pressure on the ozone generators and without compromising the energy efficiency for ozone production.

In addition to reduced construction costs, operating costs using the J-tube arrangement are lower because higher ozone concentrations (up to 16% by weight is possible with new ozone generator technologies) can be used to reduce oxygen consumption without compromising gas-liquid mixing efficiency in the contactor. And maintenance costs are lower because the multi-stage diffuser assembly only requires a small number of high-capacity, rod-type diffusers and associated gaskets that need to be inspected or replaced periodically, as compared with hundreds of diffusers for conventional fine bubble diffuser contactors.

From the standpoint of performance, the J-tube arrangement provides improved mass transfer rates by utilizing increased hydrostatic pressures (25 to 30 ft.) and aggressive gas/liquid mixing in the vertical downflow tube arrangement. The vertical configuration of the multi-stage diffuser assembly provides a flow operating range 200 to 300 percent higher than existing single-stage fine bubble diffusion ozone dissolution methods (see FIG. 13), which allows greater operational flexibility for plants with wide water flow or ozone dose variations. Additionally, a maximum ozone residual is developed in the downflow tube within a few seconds, which in turn maximizes CT exposure in the contactor (including the first cell) for disinfection applications. And ozone residuals measured at the downflow tube outlet are relatively stable, which simplifies on-line monitoring and control of the ozonation system.

From a maintenance standpoint, the multi-stage diffuser assembly can be easily removed from the downflow tube for inspecting and maintaining or replacing the fine-bubble diffusers and gaskets. Additionally, the diffuser assembly can be accessed without dewatering the inlet distribution channel or ozone contactor.

Although particular embodiments of the present invention have been illustrated and described, it will be apparent to those skilled in the art that various changes and modifications can be made without departing from the spirit of the present invention. Accordingly, it is intended to encompass within the appended claims all such changes and modifications that fall within the scope of the present invention.

What is claimed is:

1. Apparatus for introducing ozone into water for treatment for disinfection or oxidation purposes, said apparatus comprising:
    a. a contactor vessel for receiving water to be treated, the vessel including a water inlet conduit for introducing untreated water into an inlet channel within the vessel and a water outlet conduit for withdrawing treated water from the vessel;
    b. at least one diffusion chamber within the contactor vessel and within which ozone is introduced into water to be treated, the diffusion chamber containing water;
    c. at least one downflow tube having a longitudinal axis and positioned substantially vertically within the vessel, the downflow tube including a water inlet and a water outlet, wherein the downflow tube water outlet is spaced from and is positioned below the downflow tube water inlet and is positioned within a diffusion chamber, and wherein the downflow tube water inlet is submerged in the within the inlet channel;
    d. an ozone distributor positioned within the at least one downflow tube between the downflow tube water inlet and the downflow tube water outlet, the ozone distributor including a plurality of porous elements in communication with a source of ozone for introducing ozone in fine bubble form into the downflow tube, the porous elements extending transversely within the at least one downflow tube and lying in at least one transverse plane positioned along the longitudinal axis of the at least one downflow tube, wherein the ozone distributor includes an elongated central conduit member for conveying ozone and from which the respective porous elements extend and with which the porous elements are in communication so that ozone can flow from the central conduit member into and through the respective porous members to distribute ozone in fine bubble form along the longitudinal axes of the respective porous members, the central conduit member including a pair of spacer elements spaced from each other along the central conduit member longitudinal axis and extending radially outwardly from the conduit member substantially centrally positioning the conduit member within the downflow tube.

2. Apparatus in accordance with claim 1 wherein the porous elements are cylindrical and have longitudinal axes that extend radially relative to the downflow tube longitudinal axis.

3. Apparatus in accordance with claim 1 including a pressure gauge positioned at an upper end of the central conduit member to monitor ozone pressure within the central conduit member to permit a determination of resistance to gas flow of the porous elements as the apparatus is in use.

4. Apparatus in accordance with claim 1 wherein the at least one diffusion chamber includes a pair of laterally spaced, substantially parallel downflow tubes.

5. Apparatus in accordance with claim 1 including a reaction chamber downstream of the diffusion chamber, wherein the reaction chamber is separated from the diffusion chamber by a dividing wall that extends upwardly from the bottom wall of the vessel and terminates within the vessel at a point spaced from the top wall of the vessel to define a submerged weir over which treated water from the diffusion chamber flows to enter the reaction chamber.

6. Apparatus in accordance with claim 1 wherein the central conduit member includes an open lower end to enable water trapped within the central conduit member to flow therefrom when ozone gas is introduced into the central conduit member at predetermined pressure and flow conditions.

7. Apparatus in accordance with claim 6 including at least two groups of radially extending porous elements, each group lying in a respective transverse plane, the at least two groups of porous elements spaced from each other along the downflow tube longitudinal axis, wherein the number of groups of radially extending porous elements that are in communication with the ozone gas is controlled by the pressure of the ozone gas within the central conduit member.

8. Apparatus in accordance with claim 1 wherein the spacer elements each include radial members that terminate in an outer annular member having an outer surface that is spaced from the downflow tube.

9. Apparatus in accordance with claim 8 wherein the outer annular member includes an outer peripheral spacer member.

10. Apparatus in accordance with claim 9 wherein the spacer member is made from an ozone-resistant synthetic polymer and has a smooth outer face, said spacer defining means for sliding the ozone distributor along an interior surface of the downflow tube during installation and removal.

11. Apparatus in accordance with claim 1 wherein the at least one downflow tube extends upwardly to an upper wall of the contactor vessel to enable removal of the ozone distributor from the at least one downflow tube for servicing of the porous elements.

12. Apparatus in accordance with claim 11 wherein the at least one downflow tube extends through the upper wall of the contactor vessel and includes a closure element at its uppermost end.

13. Apparatus in accordance with claim 12 including a branch conduit that passes through the closure element for conducting ozone gas from an ozone gas source to the porous elements.

14. Apparatus in accordance with claim 1 wherein the porous elements extend radially outwardly relative to the downflow tube longitudinal axis.

15. Apparatus in accordance with claim 14 including at least two groups of radially extending porous elements, each group lying in a respective transverse plane, the at least two groups of porous elements spaced from each other along the downflow tube longitudinal axis.

16. Apparatus in accordance with claim 15 wherein each group of porous elements includes the same number of porous elements, and the porous elements of each group are equally angularly spaced from each other.

17. Apparatus in accordance with claim 16 wherein the porous elements of each adjacent group of porous elements are circumferentially offset relative to porous elements of an adjacent group.

18. Apparatus in accordance with claim 1 wherein the downflow tube is J-shaped, having a first vertical leg including the downflow tube water inlet and a second vertical leg of shorter length than the first vertical leg, the second vertical leg including the downflow tube water outlet, and wherein the first and second vertical legs are interconnected by at least one curved tubular connector portion to enable water to flow into the first vertical leg and to flow out of the second vertical leg.

19. Apparatus in accordance with claim 18 wherein the contactor vessel includes a bottom wall and the curved tubular connector portion of the downflow tube is below the vessel bottom wall, and the downflow tube inlet and outlet are positioned above the vessel bottom wall.

20. Apparatus in accordance with claim 18 including a deflector spaced from the downflow tube water outlet to deflect and laterally disperse outlet flow from the downflow tube.

21. Apparatus in accordance with claim 20 wherein the deflector is a substantially horizontal plate.

22. Apparatus in accordance with claim 18 including a reaction chamber downstream of the diffusion chamber, wherein the reaction chamber is separated from the diffusion chamber by a dividing wall that extends upwardly from the bottom wall of the vessel and terminates within the vessel at a point spaced from the top wall of the vessel to define a submerged weir over which treated water from the diffusion chamber flows to enter the reaction chamber.

23. Apparatus in accordance with claim 22 including means for introducing ozone quenching agents into the water downstream of the reaction chamber for removal of residual gaseous ozone.

24. Apparatus in accordance with claim 18 wherein the ozone distributor is positioned within the first vertical leg of the downflow tube for introducing ozone in fine bubble form into the downflow tube.

25. Apparatus in accordance with claim 24 wherein the ozone distributor is positioned adjacent to the downflow tube water inlet.

26. Apparatus in accordance with claim 25 including at least two groups of radially extending porous elements, each group lying in a respective transverse plane, the at least two groups of porous elements spaced from each other along the downflow tube longitudinal axis, wherein the porous elements extend radially outwardly relative to the downflow tube longitudinal axis.

27. Apparatus in accordance with claim 26 wherein each group of porous elements includes the same number of porous elements, and the porous elements of each group are equally angularly spaced from each other.

28. Apparatus in accordance with claims 26 wherein the porous elements of each adjacent group of porous elements are circumferentially offset relative to porous elements of an adjacent group.

29. Apparatus in accordance with claim 26 wherein the ozone distributor includes an elongated central conduit member for conveying ozone and from which the respective porous elements extend and with which the porous elements are in communication so that ozone can flow from the central conduit member into and through the respective porous members to distribute ozone in fine bubble form along the longitudinal axes of the respective porous members, and wherein the central conduit member includes an open lower end to enable water trapped within the ozone distributor to flow therefrom when ozone gas is introduced into the central conduit member at predetermined pressure and flow conditions.

30. Apparatus in accordance with claim 29 including at least two groups of radially extending porous elements, each group lying in a respective transverse plane, the at least two groups of porous elements spaced from each other along the downflow tube longitudinal axis, wherein the number of groups of radially extending porous elements that are in communication with the ozone gas is determined by the pressure of the ozone gas within the central conduit member.

* * * * *